United States Patent
Jolly et al.

(10) Patent No.: US 10,046,852 B2
(45) Date of Patent: Aug. 14, 2018

(54) HUB-MOUNTED ACTIVE VIBRATION CONTROL (HAVC) DEVICES, SYSTEMS, AND METHODS

(71) Applicant: LORD Corporation, Cary, NC (US)

(72) Inventors: Mark R. Jolly, Raleigh, NC (US); Russell E. Altieri, Holly Springs, NC (US); Wayne L. Winzenz, Raleigh, NC (US); Warren F. Brannan, Sanford, NC (US); Paul R. Black, Fuquay-Varina, NC (US); Doug A. Swanson, Cary, NC (US)

(73) Assignee: LORD Corporation, Cary, NC (US)

(*) Notice: Subject to any disclaimer, the term of this patent is extended or adjusted under 35 U.S.C. 154(b) by 329 days.

(21) Appl. No.: 14/434,781

(22) PCT Filed: Oct. 23, 2013

(86) PCT No.: PCT/US2013/066381
§ 371 (c)(1),
(2) Date: Apr. 10, 2015

(87) PCT Pub. No.: WO2014/113114
PCT Pub. Date: Jul. 24, 2014

(65) Prior Publication Data
US 2015/0232174 A1    Aug. 20, 2015

Related U.S. Application Data

(60) Provisional application No. 61/718,962, filed on Oct. 26, 2012.

(51) Int. Cl.
*B64C 27/00* (2006.01)
*F16F 15/14* (2006.01)
*F16F 15/18* (2006.01)

(52) U.S. Cl.
CPC ........ *B64C 27/001* (2013.01); *F16F 15/1485* (2013.01); *F16F 15/18* (2013.01);
(Continued)

(58) Field of Classification Search
CPC ........ F16F 15/1485; F16F 15/18; F16F 15/22; B64C 27/001
(Continued)

(56) References Cited

U.S. PATENT DOCUMENTS 2,603,316 A * 7/1952 Pierce .................. F16D 65/123
188/218 XL
2,966,074 A * 12/1960 Rumsey ................ F16F 15/173
74/573.13
(Continued)

FOREIGN PATENT DOCUMENTS

| WO | 2006/107741 A2 | 10/2006 |
| WO | 2009/126626 A2 | 10/2009 |
| WO | 2012/021202 A3 | 2/2012 |

OTHER PUBLICATIONS

International Bureau of WIPO, PCT International Preliminary Report on Patentability and Written Opinion of he International Searching Authority for International Application No. PCT/US2013/066381 dated Apr. 28, 2015 (11 pages).

*Primary Examiner* — Christopher P Schwartz

(57) ABSTRACT

Hub-mounted active vibration control (HAVC) devices, systems, and related methods are provided. An HAVC device (100) includes a housing (206) having a tolerance ring (600) attached to a rotary hub (702). The tolerance ring can accommodate dissimilar coefficients of thermal expansion between dissimilar metals. The HAVC device can also include a plurality of coaxial ring motors (308A, 308B, 310A, 310B) configured to rotate a plurality of imbalance masses for controlling vibration. An HAVC system can further include a de-icing distributor (208) for communicat-
(Continued)

ing instructions to one or more heating sources (HS) provided at one or more rotary blades (802) of a vehicle or aircraft. A method of controlling vibratory loads occurring at a moving platform can include providing a moving platform, mounting a vibration control device to a portion of the moving platform, and rotating at least one pair of imbalance masses such that the combined forces of the masses substantially cancel unwanted vibration of the platform.

27 Claims, 7 Drawing Sheets

(52) U.S. Cl.
CPC .. *B64C 2027/003* (2013.01); *B64C 2027/004* (2013.01); *Y10T 74/2128* (2015.01)

(58) Field of Classification Search
USPC .............. 188/17, 18 A, 218 XL, 378, 379; 267/136; 244/17.13; 416/1, 24, 43, 98
See application file for complete search history.

(56) References Cited

U.S. PATENT DOCUMENTS

| | | | | |
|---|---|---|---|---|
| 2,999,704 | A * | 9/1961 | Haller | F16D 1/0829 384/202 |
| 3,969,049 | A * | 7/1976 | Hermes | F01C 1/22 418/142 |
| 4,439,981 | A * | 4/1984 | Weiler | F01D 11/08 415/117 |
| 4,836,750 | A * | 6/1989 | Modafferi | F01D 5/025 403/28 |
| 5,634,800 | A | 6/1997 | Giamati | |
| 5,704,567 | A | 1/1998 | Maglieri | |
| 5,857,782 | A * | 1/1999 | Waskiewicz | F16C 23/084 384/493 |
| 8,109,674 | B2 * | 2/2012 | Hubbard | F16C 33/7813 384/143 |
| 2002/0079649 | A1 | 6/2002 | Terpay et al. | |
| 2006/0083617 | A1 | 4/2006 | Jolly et al. | |
| 2011/0259994 | A1 * | 10/2011 | Jolly | B64C 27/001 244/17.13 |
| 2012/0141273 | A1 * | 6/2012 | Jolly | B64C 27/001 416/43 |

* cited by examiner

HUB-MOUNTED ACTIVE VIBRATION CONTROL (HAVC) DEVICES, SYSTEMS, AND METHODS

CROSS REFERENCE TO RELATED APPLICATION

This application relates to and claims priority to U.S. Provisional Patent Application Ser. No. 61/718,962, filed Oct. 26, 2012, the disclosure of which is incorporated by reference herein in the entirety.

TECHNICAL FIELD

The present subject matter relates generally to active vibration control (AVC) devices, systems, and methods. More particularly, the present subject matter relates to hub-mounted active vibration control (HAVC) devices, systems, and methods for reducing rotor vibration levels within an aircraft.

BACKGROUND

Vibration of moving platforms can cause fatigue and wear on equipment, structural elements, occupants thereof, and/or contents associated therewith. Moving platforms can include vehicular and/or non-vehicular systems having moving elements, such as for example, aircraft, helicopters, ships, hovercraft, and/or other modes of transportation.

In rotating assembly aircraft vehicles such as helicopters for example, vibrations are particularly problematic as the vibrations can damage the helicopter structure, which can significantly limit the helicopter's operational life and/or components thereof. Conventional vibration control devices and systems utilize hub-mounted bifilar absorbers for mitigating vibrations. However, such devices and systems operate as a function of force input from the rotor and achieve maximum efficiency at only one force frequency level. In addition, conventional devices and systems incorporate multiple different materials without compensating for mismatches in thermal coefficients of expansion, and are therefore susceptible to thermal degradation, fretting, wear, and damage from heat generated by the devices and/or systems.

Accordingly, there is a need for improved vibration control devices, systems, and methods for controlling vibrations of a moving platform. In particular, there is a need to control rotary vibrations induced by a helicopter hub so that the vibrations are more efficiently minimized. There is also a need to for lightweight, compact, and robust vibration control devices, systems, and methods.

SUMMARY

In accordance with the disclosure provided herein, novel and improved active vibration control (AVC) devices, systems, and related methods are provided. In many aspects, devices, systems, and methods discloses herein have improved heat dissipation, thermal management properties, de-icing capabilities, reduced wear, reduced fretting, reduced weight, extended life expectancy, extended operating temperatures, and more compact dimensions. AVC devices, systems, and related methods can be mounted to a moving platform, such as a rotor hub, and can rotate or move therewith. Imbalance masses rotating at different frequencies can substantially cancel unwanted vibration of the moving platform.

In one aspect, the subject matter herein discloses a hub-mounted active vibration control (HAVC) device comprising a housing configured to attach to a rotary hub and capable of rotating therewith. The housing comprises a tolerance ring configured to accommodate dissimilar coefficients of thermal expansion between components of dissimilar metals. The HAVC device has a plurality of coaxial ring motors configured to rotate a plurality of imbalance masses. The HAVC device also includes an electrical unit for independently controlling a rotational position, phase, and/or speed of the plurality of imbalance masses such that the combined forces of the imbalance masses substantially cancel unwanted vibration.

In another aspect, the subject matter herein discloses an HAVC system. The system comprises a mechanical unit attached to a rotary hub, which is capable of rotating therewith. The mechanical unit includes at least one pair of imbalance masses co-rotating at nominally a same frequency. The mechanical unit may also have at least two pairs of imbalance masses, each pair of masses rotating at two (e.g., different or dual) frequencies and in two different directions. The system includes a de-icing distributor provided over at least a portion of the mechanical unit. The de-icing distributor is configured to communicate instructions to one or more heating sources provided at one or more rotary blades of a vehicle or aircraft.

In another aspect, the subject matter herein discloses a method of actively suppressing and/or controlling in-plane vibratory loads occurring at a moving platform. The method includes providing a moving platform and mounting a vibration control device to a portion of the moving platform, the device being capable of moving therewith. The device includes a mechanical unit with at least one pair of imbalance co-rotating at substantially the same frequency or at least two pairs of masses rotating at different frequencies and in different directions. A tolerance ring is attached to the mechanical unit. The tolerance ring is configured to accommodate dissimilar coefficients of thermal expansion between components of dissimilar metals contained within the mechanical unit. The method includes rotating at least one pair of imbalance masses at substantially a same frequency such that the combined forces of the imbalance masses substantially cancel unwanted vibration of the moving platform. The method may further include rotating at least two pairs of imbalance masses at different frequencies and/or in different directions, such that the combined forces of the imbalance masses substantially cancel unwanted vibration of the moving platform.

These and other objects of the present disclosure as can become apparent from the disclosure herein are achieved, at least in whole or in part, by the subject matter disclosed herein.

DETAILED DESCRIPTION

Figure 1:
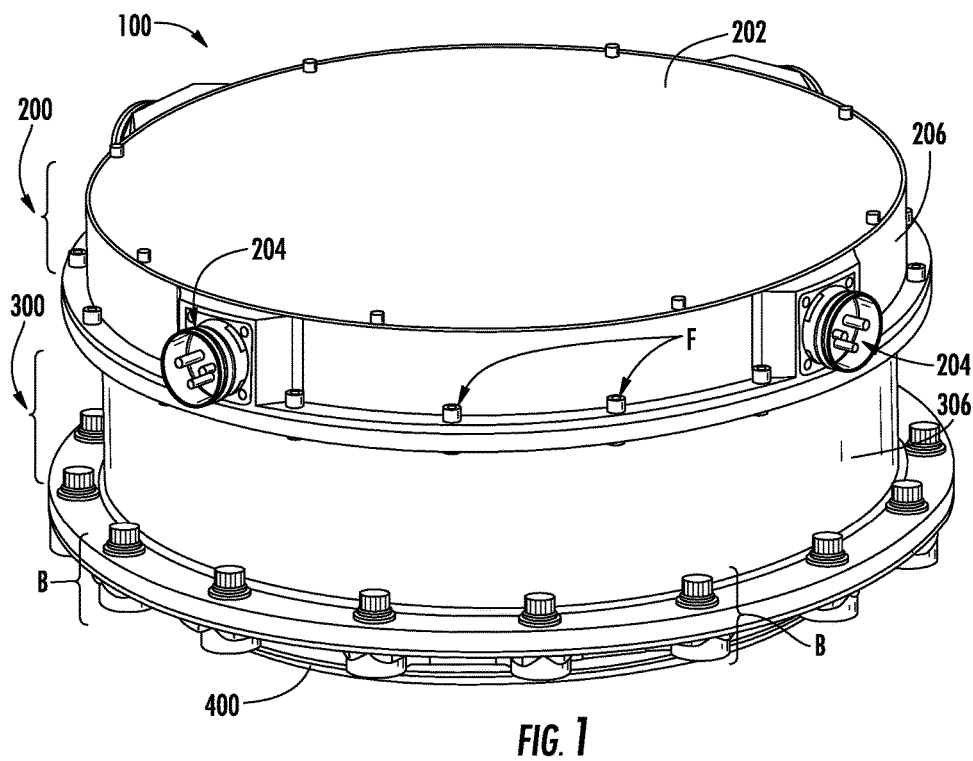
FIGS. 1 and 2 are perspective and sectional views, respectively, illustrating a hub-mounted active vibration control (HAVC) device according to aspects of the subject matter described herein.

The subject matter described herein is directed to hub-mounted active vibration control (HAVC) devices, systems, and methods for use and installation within a rotary winged aircraft. In some aspects, HAVC devices, systems, and methods are configured to reduce rotor vibration levels within an aircraft. HAVC devices, systems, and methods described herein have improved thermal management properties including improved heat conduction. HAVC devices, systems, and methods herein also include a reduced weight and reduced/more compact dimensions for improved vibration control within an aircraft.

In some aspects, HAVC devices, systems, and methods described herein have improved reliability, decreased wear (e.g., decreased "fretting"), and more compact structural dimensions (e.g., reduced weight, height, and/or diameter) via use of an integrated bearing and housing. HAVC devices, systems, and methods described herein utilize a dual stage bearing having a single outer bearing race within a single flanged housing, where the inner race of each bearing is combined with the rotor of each brushless motor. This eliminates the requirement for several parts, reduces fretting, and/or eliminates several failure modes.

HAVC devices, systems, and methods described herein also reduce fretting and improve life expectancy, operating temperature, and oil purity, compensating for mismatches between materials having different thermal expansion coefficients.

In one aspect, the subject matter herein discloses an HAVC device comprising a housing configured to attach to a rotary hub and capable of rotating therewith. The housing comprises a tolerance ring configured to accommodate dissimilar coefficients of thermal expansion between components made of dissimilar metals. The HAVC device includes a plurality of coaxial ring motors configured to rotate a plurality of imbalance masses. The HAVC device also includes an electrical unit for independently controlling a rotational position, phase, and/or speed of the plurality of imbalance masses such that the combined forces of the imbalance masses substantially cancel unwanted vibration.

In another aspect, an integrated HAVC device and deicing system is provided. The combined system has a mechanical unit attached to a rotary hub, which is capable of rotating therewith. The mechanical unit has at least one pair of imbalance masses co-rotating at substantially the same frequency for cancelling unwanted vibration. The mechanical unit may include at least two pairs of imbalance masses rotating at two (e.g., different or dual) frequencies, the combined forces of which can cancel unwanted vibration. The system can further comprise a de-icing distributor provided over at least a portion of the mechanical unit (for example, disposed within the inner diameter of the mechanical unit). The de-icing distributor is configured to communicate electrically to one or more heating sources provided at one or more rotary blades of a vehicle or aircraft.

A method of actively suppressing and/or controlling in-plane vibratory loads occurring at a moving platform is disclosed. The method includes providing a moving platform and mounting a vibration control device to a portion of the moving platform, the device being capable of moving therewith. The device includes a mechanical unit having at least one pair (e.g., in some aspects, two or more pairs) of imbalance masses for rotating about an axis, the combined rotation forces of which substantially cancel unwanted vibration of the moving platform, such as a rotor hub. A tolerance ring is provided and/or attached within a portion of the mechanical unit. The tolerance ring accommodates dissimilar coefficients of thermal expansion between components of dissimilar metals contained within the mechanical unit. The method includes rotating at least one pair of imbalance masses at substantially a same frequency such that the combined forces of the imbalance masses substantially cancel unwanted vibration of the moving platform. The method further includes rotating at least two pairs of imbalance masses at different (e.g., dual) frequencies and/or in different directions such that the combined forces of the imbalance masses substantially cancel unwanted vibration of the moving platform.

As used herein, the terms "bearings", "bearing assembly", and "bearing stage" refer to combinations of bearing components including at least one bearing inner race, bearing outer race, and ball bearing. In some aspects, a bearing outer race is a bearing component that can be integrated or formed as a single piece for multiple ball bearings, such as multiple stacked ball bearings. A tubular space or slug is an optional bearing component that can be contained within a portion of the bearing or bearing stage.

Figure 2:
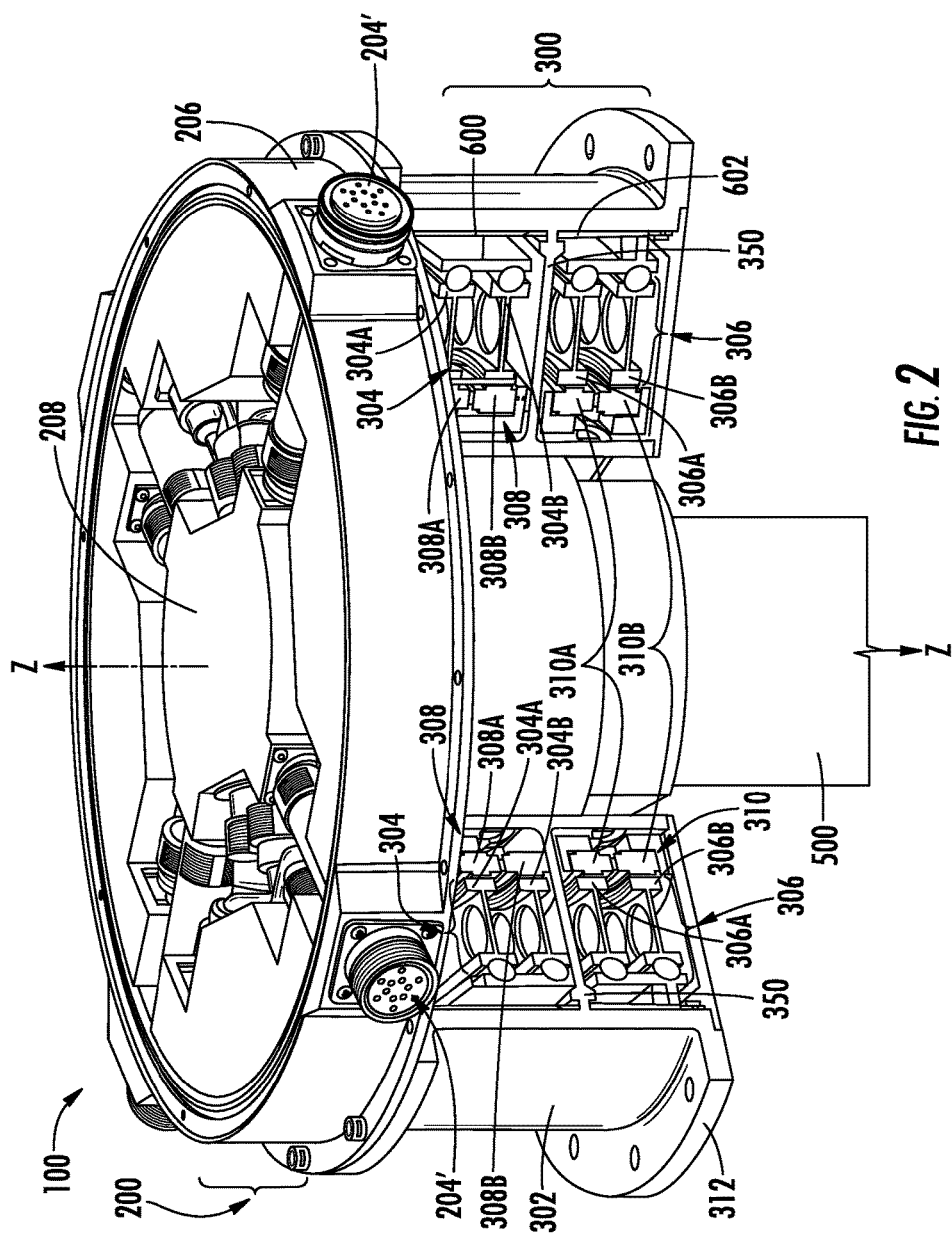

FIGS. 1 to 8 illustrate various views and/or features associated with HAVC devices, systems, and related methods for controlling vibration of a moving platform, namely, of a vehicular system such as an aircraft, a tandem or single rotor helicopter (e.g., 800, FIG. 8), a hovercraft, and/or any other vehicular system having at least one moving platform. FIGS. 1 and 2 illustrate an HAVC device, generally designated 100. HAVC device 100 comprises an electrical unit generally designated 200, a mechanical unit generally designated 300, and an adaptor plate 400 by which HAVC device 100 directly mounted to a rotor hub (702, FIGS. 6 and 7) via one or more mechanical fasteners such as one or more pins, screws, clips, hinges, or bolted assemblies B. Rotor hub (e.g., 702, FIGS. 6 and 7) includes a main rotor hub of a helicopter, about which one or more blades of a rotary winged aircraft rotate.

HAVC device 100 includes a removable cover plate 202 disposed over electrical unit 200 for at least partially housing electronic devices contained therein. HAVC device 100 has one or more electrical interfaces 204 disposed at and/or extending from electrical unit 200 for sending and/or receiving electrical signals between electrical unit 200 and other portions of the aircraft via a wired link, a wireless link, a data link, or a data bus (not shown).

Cover plate 202 is removable for easy replacement of electrical components therein. Such components are accessible through the removable cover plate 202 while the remainder of HAVC device 100 remains attached to the moving platform (e.g., a rotary hub 702, FIG. 8).

Electrical unit 200 is mounted directly to mechanical unit 300 and interfaces with an electrical module, such as a slip ring (e.g., 500, FIG. 2) to receive power from at least two redundant busses. Outermost flange 312 of mechanical unit 300 is configured to mount to adaptor plate 400 via an easily accessed circular pattern of bolts or bolted assemblies B.

Figure 6:
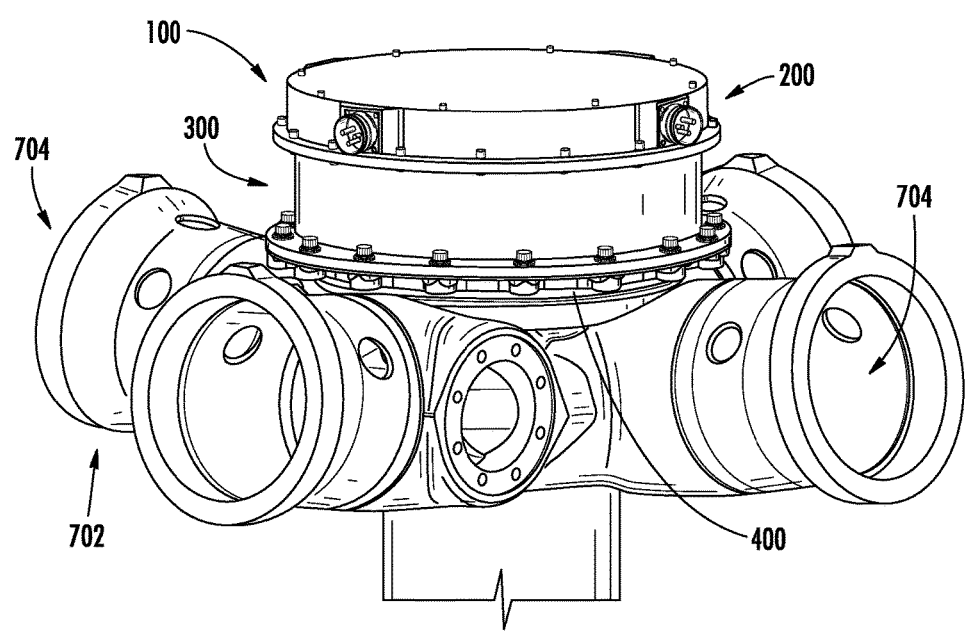
FIGS. 6 and 7 are perspective and exploded views, respectively, illustrating an HAVC system according to aspects of the subject matter described herein.
Figure 7:
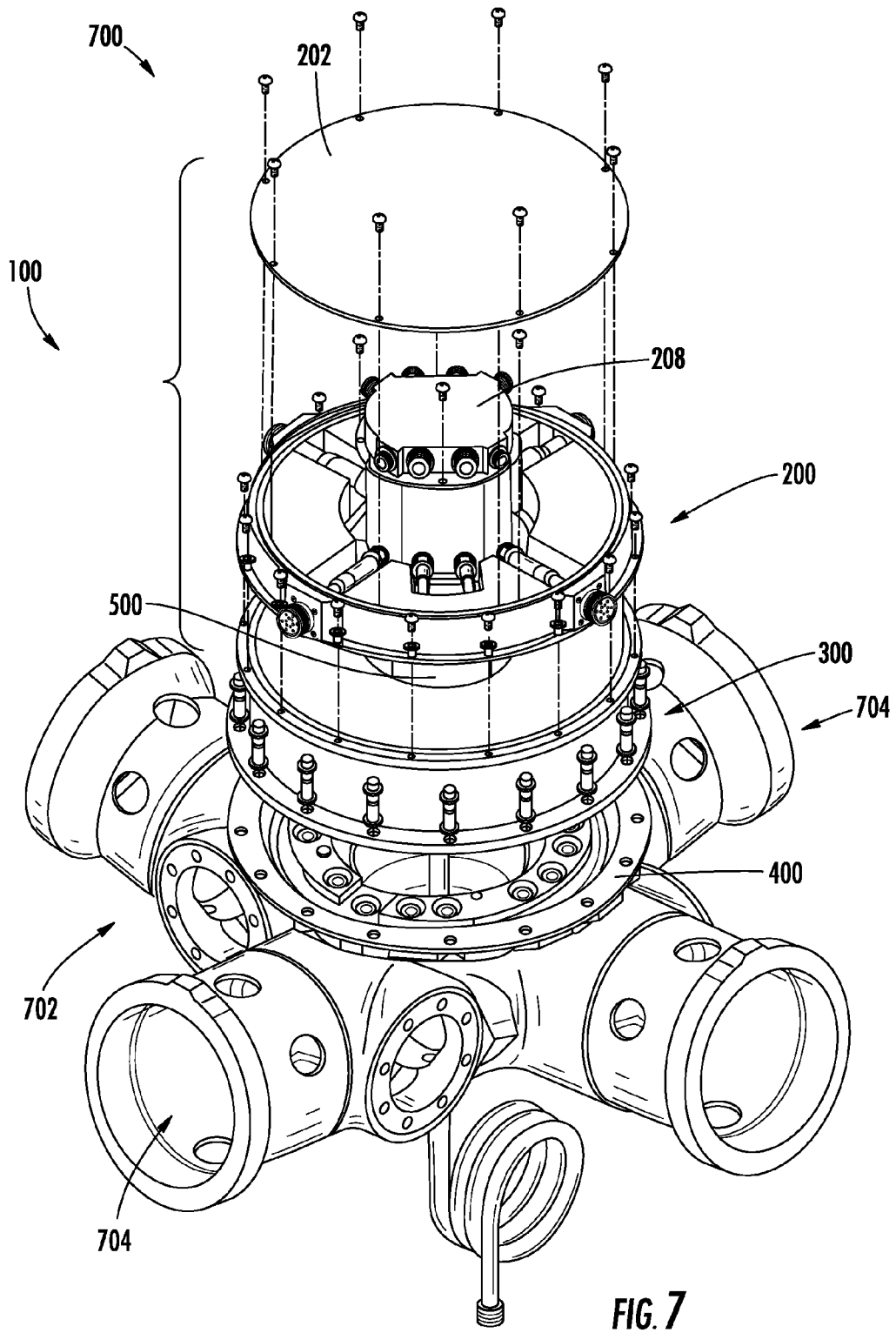

Adaptor plate mounts directly to a moving platform, such as a rotor hub (e.g., 702, FIGS. 6 and 7). The entire HAVC device 100 is rotatable with the rotor hub (702, FIGS. 6 and 7) at once per-rev (1P).

Electrical unit 200 has one or more independent processors housed within an outer housing 206 for controlling aspects of one or more pairs of imbalanced rotors. Electrical unit 200 also has one or more orthogonal in-plane accelerometers within housing 206 for enabling local vibration control.

Electrical unit 200 is configured to receive and condition aircraft power for providing power to HAVC devices and systems described herein, facilitate stable servo motor control based on motor sensor feedback, measure and process inputs (e.g., from one or more accelerometers, (not shown)), command the force amplitude and phase of the mechanical unit 300 for minimizing a cost function based upon process inputs, perform Built-In Test (BIT) and report status and fault information to the aircraft avionics system, and/or manage communication through the slip ring (500, FIG. 2) with aircraft data busses and/or with an active vibration control (AVC) central controller.

NP (where "N" is the number of blades and "P" denotes "per-revolution" or "per-rev") denotes a primary frequency of vibration measured with respect to a fixed reference frame. Thus, HAVC devices and systems described herein output forces adapted to mitigate and/or actively control NP vibration frequencies. To actively control vibration, imbalanced rotors of HAVC device 100 is configured to rotate one pair of imbalance masses at a frequency of (N−1)P or two pairs of imbalance masses at dual frequencies including (N−1)P and (N+1)P, each measured with respect to a rotating reference frame.

Electrical unit 200 also comprises parallel identical electronic architectures for the (N+1)P (upper) and the (N−1)P (lower) imbalanced rotors (e.g., 304 and 306, respectively FIG. 2) for minimizing the loss of operation of one or both imbalanced rotors and/or failures associated with separate AC power busses. By using improved electronics, the electronics used to drive HAVC device 100 have reduced height, and may be compactly packaged upon rectangular and/or arc-shaped boards within housing 206. Notably, the structural aspects and design of electrical unit 200 eliminates discrete wires and creates flexible circuit interconnects between the motors (e.g., of mechanical unit 300) and circuit boards (e.g., of electrical unit 200).

Electrical unit 200 is configured to optionally utilize one or more multi-layer stacked ceramic capacitors (MLCC) as opposed to larger electrolytic capacitors. MLCC's can reduce the overall size (e.g., height) of the capacitors to approximately 0.6 inches (in.), thereby enabling low profile electronics. MLCC's are also advantageously able to withstand environments of about 125° C., more or less.

Electrical unit 200 integrates circuitry required to power, drive, program, and/or control more than one portion of mechanical unit 300. An outer diameter of housing 206 is approximately the same as an outer diameter of housing 302 of mechanical unit 300. This reduces and/or eliminates drag associated with different diameters of housings. Electronics for both a lower portion (i.e., rotating at a frequency of (N−1)P) of mechanical unit 300 is advantageously integrated with electronics for an upper portion (i.e., rotating at a frequency of (N+1)P) of mechanical unit 300, and electronics for both are contained within a single housing 206 of electrical unit 200. Electrical unit 200 can, for example, comprise a height of less than about one inch (in.) and fit directly above the mechanical unit 300, without requiring larger diameter housing, which could negatively affect drag.

Mechanical unit 300 has at least one pair of co-rotating eccentric masses or mass concentrations (e.g., having a rotation frequency of (N−1)P) for cancelling unwanted vibration. Mechanical unit 300 can have at least two pairs (i.e., at least four total masses) of independently controlled and rotating eccentric masses or mass concentrations (e.g., one pair having a frequency of (N−1)P and the other pair having a frequency of (N+1)P). Each pair of masses rotates at a different frequency and/or in a different direction for collectively cancelling unwanted vibration. Where multiple pairs of imbalance masses are used, each pair of mass concentrations can be configured to produce vibration canceling forces in the plane of a rotor hub (e.g., 702, FIGS. 6 to 8).

For example, and where at least two pairs of imbalance masses are used, a first mass or pair of masses rotates in a direction of the rotor and at a first frequency (i.e., (N−1)P) and at least one other mass or pair of masses rotates in a direction opposite of the rotor at a second frequency (i.e., (N+1)P). For each pair of rotating eccentric masses, the force amplitude of HAVC device 100 is adjusted by changing the relative phase between the two eccentric masses, and the force phase is adjusted by changing the absolute phase of the two eccentric masses with respect to a reference angle derived from a tachometer (not shown).

FIG. 2 illustrates a partial sectional view of HAVC device 100, which is also devoid of cover plate 202. Electrical unit 200 has electrical interfaces 204' configured to transmit electrical signals, control, power, and/or information between a data bus or centralized bus and portions housed within housing 206 of electrical unit 200. HAVC device 100 has an integrated de-icing distributor 208 centrally disposed within electrical unit 200. De-icing distributor 208 is disposable within portions of housing 206 and/or is mounted above mechanical unit 300 of HAVC device 100. Electrical interfaces 204' communicate electrical signals, controls, and/or other information between de-icing distributor 208 and other portions of the aircraft, such as the blades.

In some aspects, de-icing distributor 208 controls and distributes power to de-ice systems via electrical interfaces 204'. De-icing distributor 208 also receives information regarding temperature and/or other inputs for detecting and preventing ice from forming on aircraft blades (e.g., 802, FIG. 8). Integrating de-icing distributor 208 within HAVC device 100 reduces and/or re-distributes weight within the aircraft by relocating the weight of the distributor to a centralized location with respect to helicopter blades. A centralized de-icing distributor 208 simplifies electrical circuitry, as circuitry is contained at a centralized location with respect to helicopter.

In some aspects, de-icing distributor 208 is configured to detect the formation of ice and/or detect temperatures associated with ice formation. In addition, de-icing distributor 208 is configured to communicate instructions and/or electrical power to one or more heating sources (e.g., HS, FIG. 8) disposed at one or more rotary blades (e.g., 802, FIG. 8) for preventing ice from forming thereon or, for removing ice. De-icing distributor 208 comprises one or more processors and/or memory devices configured to execute instructions for detecting ice formation and/or conditions for forming ice and for communicating instructions to heating sources to heat rotary blades as needed.

As FIG. 2 further illustrates, portions of electrical unit 200 and mechanical unit 300 are integrally formed and/or mechanically joined. For example, respective housings of electrical and mechanical units 200 and 300, respectively, are integrated via one or more mechanical connectors or fasteners, generally designated F. As noted hereinabove, housing 206 of electrical unit 200 has a diameter that is approximately the same as and/or equal to a diameter of housing 302 of mechanical unit 300. This reduces or eliminates drag associated with HAVC device 100.

Housings 206 and 302 of respective units may optionally comprise aluminum and/or an aluminum alloy. Aluminum and alloys thereof, have a high thermal conductivity and weigh less than traditional housing materials, such as stainless steels or titanium. Thus, housings 206 and 302 of respective units readily conduct heat away from electrical and mechanical components housed within HAVC device 100. This improves thermal management within device 100 as well as heat dissipation therefrom. Aluminum housings also allow components to run cooler for longer periods of time, increasing operating temperatures, extending the life of HAVC devices and/or components thereof. Aluminum housings decrease weight of HAVC devices and systems. Housings 206 and 302 of respective units can comprise materials other than aluminum and/or alloys thereof, if desired.

In some aspects, housings 206 and 302 of electrical and mechanical units 200 and 300, respectively, collectively define and/or include a single housing having an inner diameter for housing one or more electrical and mechanical components. For example, housings 206 and 302 have a single housing for one or more components including, a slip ring 500, a de-icing distributor 208, and a motor with motor winding assemblies 308/310, imbalance masses, and/or rotors.

As FIG. 2 further illustrates, mechanical unit 300 of HAVC device 100 has one or more stacked motors comprised of one or more stacked imbalanced rotors and/or stacked motor winding assemblies. HAVC device 100 has a device having at least one pair of co-rotating eccentric masses, or at least two pairs of independently controlled eccentric masses for rotating to produce vibration canceling forces in the plane of the rotor. Where at least two pairs are used, each pair rotates at two specific frequencies (e.g., (N−1)P and (N+1)P) and in opposing directions. As the imbalanced rotors and imbalances masses rotate, the resultant forces is perceived as vibrations for counteracting, mitigating, and/or cancelling vibrations of rotor hub (e.g., 702, FIGS. 6 and 7).

HAVC device 100 contains one pair of imbalance masses configured to co-rotate in a direction of the rotor at (N−1)P, as measured with respect to a rotating reference frame. Additionally, HAVC device 100 has at least one other pair of masses configured to rotate in a direction opposite of the rotor at (N+1)P, as measured with respect to a rotating reference frame.

Where two pairs of masses are present, the masses with respective rotors and bearings, rotating at (N+1)P are disposed above the masses with respective rotors and bearings, rotating at (N−1)P. That is, the (N+1)P masses/rotors/bearings are disposed in an upper portion of housing 302 (e.g., located above a divider 350) and the (N−1)P masses/rotors/bearings are disposed in a bottom portion of housing 302 below divider 350. As described hereinbelow, the masses/rotors/bearings rotating at (N+1)P rotate in a direction opposite from the masses/rotors/bearings rotating at (N−1)P. The entire HAVC device 100 is configured to rotate with the rotor at once per-rev (1P), thus, the resultant rotational speed of both pairs of eccentric masses in the fixed reference frame is NP.

Still referring to FIG. 2, HAVC device 100 has a first set or a first pair of imbalanced rotors generally designated 304 provided in an upper portion of mechanical unit 300, and a second set or a second pair of imbalanced rotors generally designated 306 provided in a lower portion of mechanical unit 300. HAVC device 100 having only one pair of imbalanced rotors 306 and one pair of respective imbalance masses is also contemplated.

Mechanical unit 300 is physically separated internally within housing 302 into upper and lower portions via a substantially horizontal divider 350 of housing 302. Each pair of imbalanced rotors 304 and 306 has annular rotors configured to rotate about a center axis Z. Imbalanced rotors 304 rotate in a first direction (e.g., clockwise) that is opposite from imbalanced rotors 306, which rotate in a second opposing direction (e.g., counter-clockwise).

First and second sets of imbalanced rotors 304 and 306, respectively, each comprise a first upper imbalanced rotor 304A and 306A, respectively, and a second lower imbalanced rotor 304B and 306B, respectively. Each pair of imbalanced rotors 304A/304B and 306A/306B, respectively, is vertically stacked with respect to each other. Portions of each individual imbalanced rotors 304A, 304B, 306A, and 306B are configured to support a respective imbalance mass. That is, each of first and second sets of imbalanced rotors 304 and 306, respectively, has two independently controlled eccentric masses provided between and/or over respective first and second imbalanced rotors 304A, 304B, 306A, and 306B for a total of at least four imbalanced rotors supporting at least four independently controlled masses per HAVC device 100.

The first set of imbalanced rotors 304 rotates at (N+1)P and is provided within an upper portion of housing 302. The first set of imbalanced rotors 304 is configured to actively cancel in-plane (N+1)P vibratory loads occurring at a moving platform, such as a rotor hub (e.g., 702, FIGS. 6 and 7) and as measured in a reference frame rotating with the rotor hub. A second set of imbalanced rotors 306 rotates at (N−1)P and is provided within a lower portion of housing 302. That is, second set of imbalanced rotors 306 are configured to actively cancel in-plane (N−1)P loads occurring at the rotor hub as measured in a reference frame rotating with the rotor hub. Only the lower (i.e., second) set of imbalanced rotors 306 is provided in device 100 for actively cancelling in-plane (N−1)P loads occurring at the rotor hub as measured in a reference frame rotating with the rotor hub. Where multiple sets of rotors and masses are used, each set of imbalanced rotors (e.g., first and second sets of imbalanced rotors 304 and 306) has a common design, which improves ease of assembly and manufacture.

Divider 350 physically separates first set of imbalanced rotors 304 from second set of imbalanced rotors 306. Each set of imbalanced rotors is stackable, and has a dual stage bearing assembly disposed along an outer edge, at a furthest point of each rotor away from central axis Z. Together, the first and second sets of imbalanced rotors 304 and 306, respectively, rotate sets of imbalanced masses for actively canceling NP vibrations in a fixed reference frame. HAVC device 100 has one pair of masses configured to co-rotate via second set of imbalanced rotors 306 in a direction of the rotor at (N−1)P, and at least one other pair of masses configured to co-rotate in a direction opposite of the rotor at (N+1)P via first set of imbalanced rotors 304, each measured with respect to a rotating reference frame.

In one embodiment, HAVC device 100 has one or more brushless motors, including first and second motor winding assemblies 308 and 310, respectively. First motor winding assembly 308 is vertically stacked with respect to and/or vertically disposed over second motor winding assembly 310. First and second sets of imbalanced rotors 304 and 306, respectively, rotate about first and second motor winding assemblies 308 and 310, respectively. First and second sets of imbalanced rotors 304 and 306 rotate imbalance mass concentrations about first and second motor winding assemblies 308 and 310, respective. In some aspects, HAVC device 100 has only one motor assembly 310 (e.g., for rotating second set of imbalanced rotors 306).

Each of first and second motor winding assemblies 308 and 310 have a pair of motor winding assemblies including a first coaxial ring motor 308A and 310A, respectively, and a second coaxial ring motor 308B and 310B, respectively. At least four imbalance masses are controlled via signals provided to at least four coaxial ring motors 308A, 308B, 310A, and 310B. Each motor winding assembly 308 and 310 rotates at least two imbalanced rotors and at least two respective imbalance masses for actively suppressing and/or controlling vibratory loads. A portion of each coaxial ring motor 308A, 308B, 310A, and 310B is integrated with a portion of each annular imbalanced rotor 306A, 306B, 308A, and 308B, respectively.

Still referring to FIG. 2, HAVC device 100 has slip ring 500. Slip ring 500 has a device and/or interface configured to transfer power from a main power source (not shown) of a vehicular system to HAVC device 100 and/or to de-icing distributor 208. Slip ring 500 is configured to communicate control signals between a controller and HAVC device 100, between a controller and de-icing distributor 208 and/or a combination thereof. Sip ring 500 communicates control signals via one or more wired data links, data busses, or wireless links to and/or from one or more controllers of vehicular system.

De-icing distributor 208 is integrated directly into the HAVC device 100. Slip ring 500 and de-icing distributor 208 encompass a portion or space within an inner diameter of housing 206 of HAVC device 100. When cover plate 202 is removed, the electrical interconnects between slip ring 500 and de-icing distributor 208, and de-icing distributor 208 and de-ice bundles (e.g., which communicate to each blade) are visible. Electrical interconnects are removed and/or replaced easily via removal of cover plate 202. HAVC device 100 includes electronics modules that can be individually removed and/or replaced without removing portions of HAVC device 100.

In some aspects, slip ring 500 includes a wireless, non-contact slip-ring, meaning that there is no physical contact between the rotating and fixed parts of the vehicular system for which slip ring 500 facilitates communication. Non-contact slip rings provide rotor head electronic systems with more reliable power in the rotating frame for active rotor and de-icing solutions. In some embodiments, slip ring 500 includes a wireless, non-contact slip ring available from, for example, PowerbyProxi, Ltd., of Auckland, New Zealand.

Slip ring 500 can be at least partially disposed within an inner diameter of mechanical unit 300 and at least partially within an inner diameter of electrical unit 200. In other aspects, slip ring 500 attaches directly to the bottom of de-icing distributor 208, and hangs partly or completely below a portion of the HAVC device 100. A helicopter mast is hollow for accommodating placement of slip ring 500.

Figure 3A:
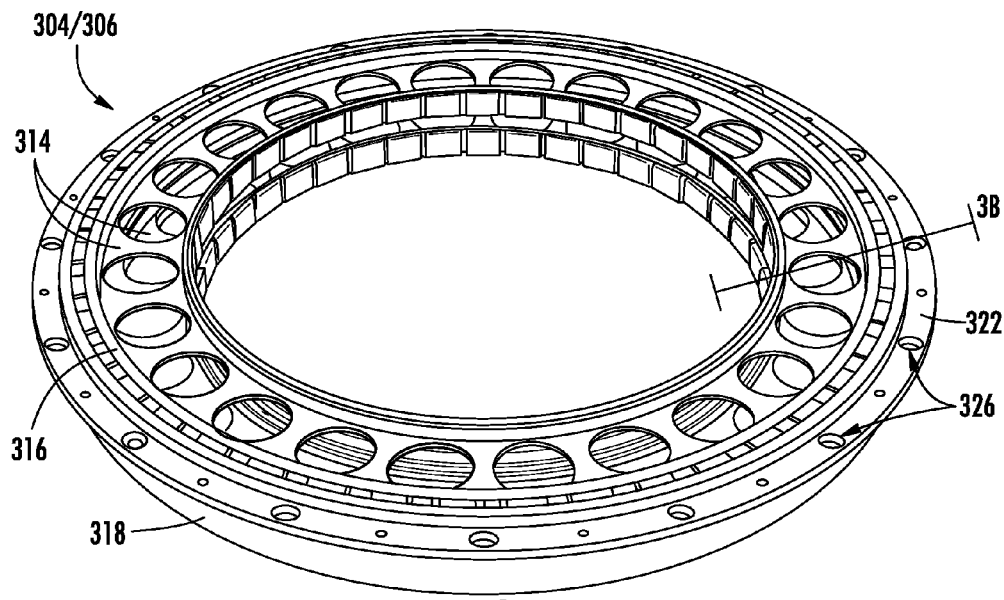
FIGS. 3A to 3C are views illustrating one or more HAVC device components according to aspects of the subject matter described herein.
Figure 3B:
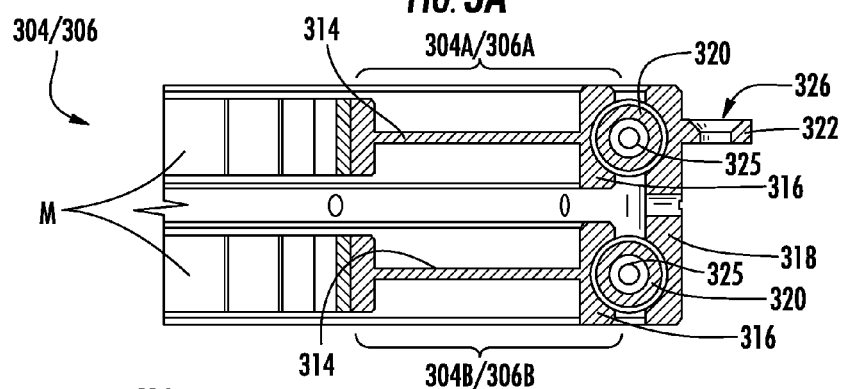
Figure 3C:
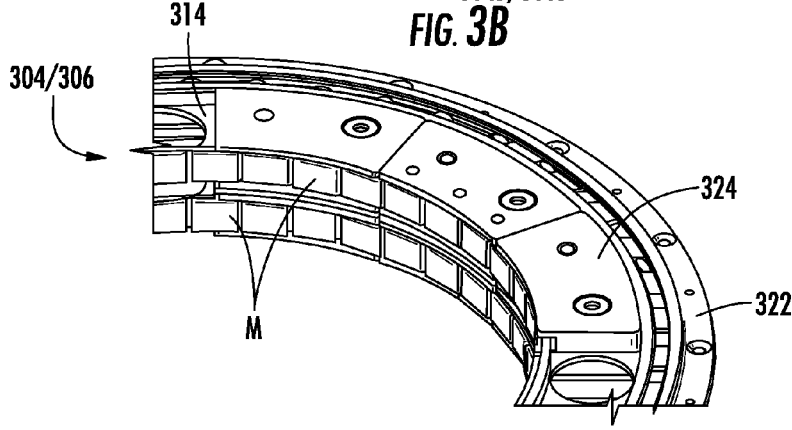

FIGS. 3A to 3C are views of one or more HAVC device components according to aspects of the subject matter described herein. FIGS. 3A to 3C illustrate perspective and sectional views of one set of imbalanced rotors (e.g., either the upper or lower imbalanced rotors) designated 304/306.

As FIGS. 3A and 3B illustrate, each set of imbalanced rotors has a first imbalanced rotor 304A/306A vertically stacked over a portion of second imbalanced rotor 306A/306B. Each of first and second imbalanced rotors 304A/306A and 304B/306B, respectively, have annular rings having one or more support members or support portions 314 configured to support one or more imbalance masses or imbalance mass concentrations (e.g., 324, FIG. 3C).

FIG. 3B illustrates a dual stage integrated bearing. Imbalanced rotor 304/306 has an integrated bearing component comprised of stacked inner bearing races 316 and a single outer bearing race 318. That is, dual stage bearing is integrated in a single housing comprised of a single outer bearing race 318 with optional flanged housing. The inner bearing races 316 and outer bearing race 318 are collectively referred to "bearing stages", in which ball bearings 325 can be provided. Tubular slug spacers 320 can be provided and/or vertically stacked between inner races of bearing stages within imbalanced rotor 304/306 to maintain spacing between the ball bearings. Tubular slug spacers 320 require lower power and a lower height than a dual riveted bearing cage, and improve bearing efficiency.

A plurality of ball bearings 325 is vertically stacked within imbalanced rotor 304/306. Ball bearings 325 are configured to independently move between portions of each respective inner bearing race 316 and a portion of outer bearing race 318 thereby allowing imbalanced rotors 304/306 to rotate about a central axis (e.g., Z, FIG. 2). Bearing stages (e.g., comprised of races 316, 318) and tubular slug spacers 320 each include a stainless steel material or alloy. Tubular slug spacers 320 have a plastic material, which contributes to weight reduction in device 100. Different sizes and/or diameters of ball bearings 325 are provided and used within tubular slug spacers 320.

Integrating outer race 318 of two bearings decreases the number of parts required for the bearing assembly and improves efficiency. The combination of the two bearings into the single outer stage or outer housing is enabled by using the tubular slug spacers 320 between balls 325 in the bearing.

Imbalanced rotors 304/306 and respective bearings include at least one outermost flange 322 provided about an outer diameter of imbalanced rotor 304/306. Outermost flange 322 is integrated with outer bearing race 318. Flange 322 has a plurality of attachment holes 326 by which outer bearing race 318 and respective imbalanced rotor 304/306 are fixedly attached within housing 302 of mechanical unit 300. For example, attachment holes 326 are configured to interface with portions of a tolerance ring (e.g., 600, FIGS. 4A and 4B) and be bolted or affixed thereto. Imbalanced rotors 304/306 can be bolted within housing 306 of mechanical unit 300 via a bolt or other connector or fastener threading extending through attachment holes 326 and a threaded opening (e.g., 608, FIGS. 4A and 4B) of a tolerance ring (e.g., 600, FIGS. 4A and 4B) of housing 302.

The integrated dual bearing stage and tubular slug spacer 320 design of HAVC device 100 improves/reduces drag and/or weight associated with HAVC device 100 by eliminating a riveted cage for housing ball bearings. In one embodiment, HAVC device 100 weighs less than approximately 100 lbs., and in another embodiment, even less than approximately 80 lbs. This is partly achieved by using lighter weight materials (such as aluminum housings 206, 302), stacking electrical components above mechanical components, consolidating electrical components via incorporation of a de-icing distributor 208 (FIG. 2), and by eliminating steel housings and/or other steel components from bearings. By reducing the amount of steel used, significant weight savings are achieved. Using the dual stage bearing with tubular slugs between the ball bearings 325, instead of a riveted cage, significantly reduces weight. Tubular slug spacer 320 can allow larger ball bearings 325 to fit within the same cross-section, which increases the bearing load capacity. Tubular slug spacer 320 can comprise hollow steel or hollow plastic tubes, which advantageously reduces weight compared to a metallic cage. Furthermore, by using a tubular slug bearing the load of one stage can be managed with a smaller diameter bearing; thus, an outer diameter of the HAVC device 100 housing 302 can be advantageously reduced.

FIG. 3B further illustrates bearing integrated with brushless rotor component(s), as inner race 316 of each bearing is combined with the rotor and permanent magnet M of each brushless motor. One or more permanent magnets M is disposed proximate an end of each respective support members 314 that is away from and/or opposing an end having ball bearings 325. Permanent magnets M can comprise a portion of the brushless motor winding assemblies 308/310 (FIG. 2), and can be provided on a portion of a motor rotor for interfacing with electromagnets provided on the motor winding assembly. Permanent magnets M interface with electromagnets for at least controlling a direction, a rotational speed, a rotational position, and/or a rotational phase of the plurality of imbalanced rotors 304/306 and respective masses, according to commands from electrical unit 200. HAVC device 100 integrates the motor and/or portions thereof (e.g., motor rotors, permanent magnets M) as part of the bearing assembly. This dramatically lowers the number of discrete components, reduces weight, eliminates failure modes, and increase reliability of the device.

FIG. 3C illustrates placement of an imbalanced mass 324 over a portion of imbalanced rotor 304/306. Another imbalance mass (not shown) is provided on support portion 314 below mass 324, thus forming at least one pair of masses (e.g., two masses total) per imbalanced rotor 304/306. In this embodiment, mechanical unit 310 has two pairs of imbalanced rotors 304/306 in upper and lower portions thereof, thus, a total of four imbalance masses 324 or imbalance mass concentrations can be provided per HAVC device 100.

Thermal management and heat dissipation of HAVC device 100 is improved via the integrated dual bearing stage design provided herein. For example, electrical components within electrical unit (200, FIGS. 1 and 2) generate heat and are also in close proximity to heat generating components housed within mechanical unit 300 (FIGS. 1 and 2). Improved cooling of components within electrical unit 200 (FIGS. 1 and 2) provide for lower operating temperatures and increased operating life. HAVC device 100 provides a dual stage bearing assembly comprised of inner bearing races 316 and a single outer bearing race 318. Bearing assembly is bolted within an aluminum housing 302. As aluminum and/or alloys thereof can readily conduct heat, the provision of bearings within housing 302 increases the amount of aluminum surrounding the outer bearing race 318, and improves thermal management within HAVC device 100. The amount of heat conducted away from an aluminum electronics cavity, such as electrical unit 200 (FIGS. 1, 2) is also improved. Heat is easily conducted outside of HAVC device 100 via respective aluminum housings 206 and 302.

Reducing mechanical wear or "fretting" is also improved with a dual bearing stage within HAVC device 100. Using a bearing assembly having an integrated outer race 318 reduces and/or eliminates almost all fretting due to discrete components wearing against each other. This change allows a two-stage bearing to be assembled as a single piece. Any wear due to the fretting components happens outside of an O-Ring seal (not shown), keeping the lubricating oil inside HAVC device 100 clean and/or more pure.

FIGS. 3A to 3C illustrate bearing stages associated with either the (N−1)P (i.e., lower) and/or (N+1)P (i.e., upper) imbalanced rotors 304/306. Thus, imbalanced rotors 304/306 have a common design, and do not require different, specific parts. This improves cost and commonality, as imbalanced rotors 304/306 can be efficiently produced and manufactured.

As FIG. 3C illustrates, portions of the bearing assembly including bearing inner races 316 are combined into a single piece with the brushless motor rotor with permanent magnets M. The single piece eliminates numerous parts, thereby increasing reliability and ease of assembly. A single piece reduces an envelope for installing the HAVC device 100. In this configuration, flanges 322 or flanged portions imbalanced rotors 304/306 bolt through the motor rotor and into each other. When used, outer flange 322 contributes to providing a solid and non-fretting connection.

Figure 4A:
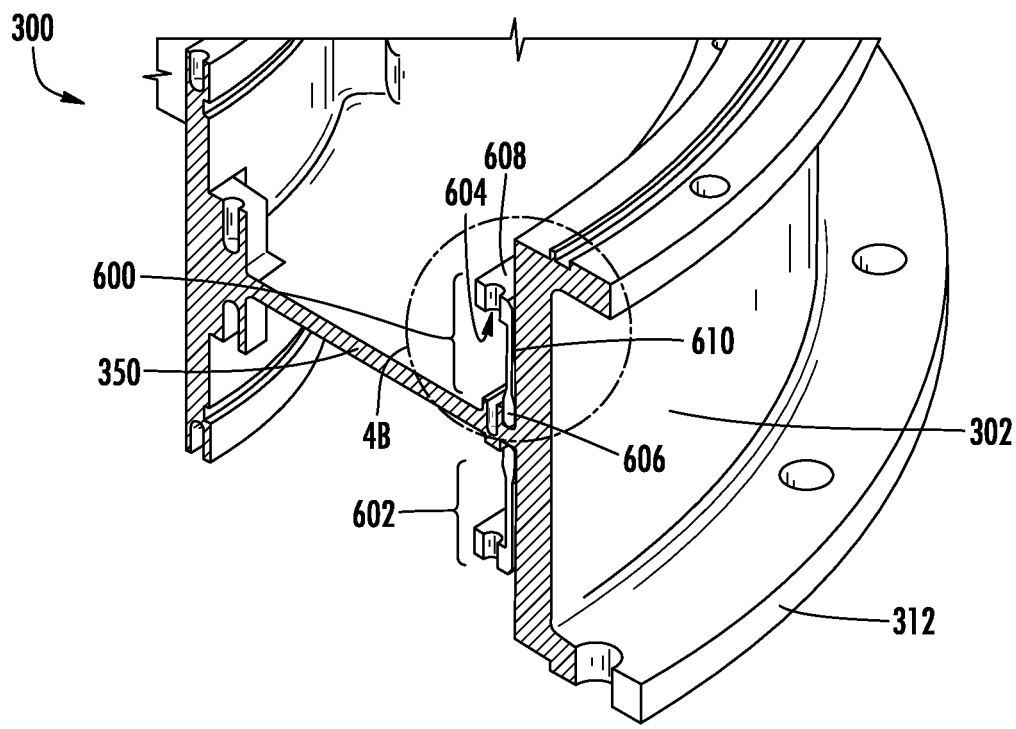
FIGS. 4A and 4B are perspective and sectional views, respectively, illustrating one or more other HAVC device components according to aspects of the subject matter described herein.
Figure 4B:
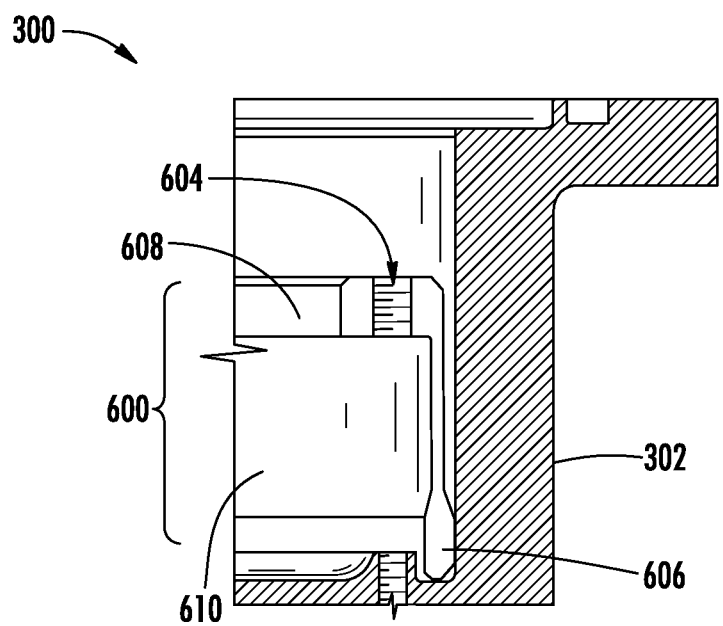

FIGS. 4A and 4B illustrate perspective and sectional views of mechanical unit 300 and respective housing 302. First and second tolerance rings 600 and 602 are provided between portions of housing 302 and bearing assemblies of upper and lower imbalanced rotors 304/306 (e.g., which are provided on either side of divider 350). Tolerance rings 600 and 602 compensate for mismatches in thermal expansion between components of dissimilar metals, for example, a stainless steel outer race 318 (FIG. 3B) and an aluminum housing 302. Compensation for mismatches in thermal expansion via tolerance rings 600 and 602 increases bearing life by reducing wear and fretting, as well as preventing binding of the bearing.

For example, tolerance rings 600 and 602 mitigate the effects of thermal expansion differences between dissimilar metals, which, if not addressed, result in large power increases (e.g., due to potential binding of the bearing) and extreme size differentials between steel and aluminum parts. Furthermore, extreme wear causes extensive operations requirements by having to change the oil in the system at greatly increased intervals.

As described hereinabove, housing 302 of mechanical unit 300 is aluminum, thereby improving heat dissipation and reducing weight of device 100. However, other materials can be provided and are contemplated herein. To accommodate the differential thermal expansion between a steel bearing assembly (e.g., comprised of inner races 316 and outer race 318) and the aluminum housing 302, upper and lower tolerance rings 600 and 602 are used therebetween. Tolerance rings 600 and 602 allow expansion and/or contraction between bearing assemblies and housing 302 in response to changes in temperature without affecting vibration control. In some aspects, tolerance rings 600 and 602 comprise a high strength steel material.

As FIGS. 4A and 4B illustrate, tolerance rings 600 and 602 have a plurality of threaded openings 604 configured to align with a plurality of attachment holes 326 (FIG. 3B) provided in flange 322 (FIG. 3B) of bearing assembly. Imbalanced rotors 304/306 are bolted into housing 302 via interfacing between attachment holes 326 of flange 322 and openings 604 of tolerance ring 600.

Tolerance rings 600 and 602 have a lower attachment point 606 and a track 608. Track 608 extends directly against and/or along an inner diameter of housing 302. In some aspects, track 608 of tolerance ring extends about an entire inner circumference of housing 302. Tolerance rings 600 and 602 can be press fit with housing 302 and retained via bolted flange 322 of outer race 318 of the bearing assembly. The bearing assembly of imbalanced rotors 304/306 is free to expand and contract when subjected to different temperatures without binding. The bolted rotor/bearing/tolerance ring/housing assembly also continues to stay tight over the entire operating temperature range to avoid fretting. The steel imbalanced rotors 304/306 and respective bearing assemblies expand at a different rate than the aluminum housing 302 due to differences in thermal expansion coefficients. Tolerance rings 600 and 602 make up for the differences, and allow bearings room to expand and contract freely within housing 302 while maintaining a tight fit.

Figure 5:
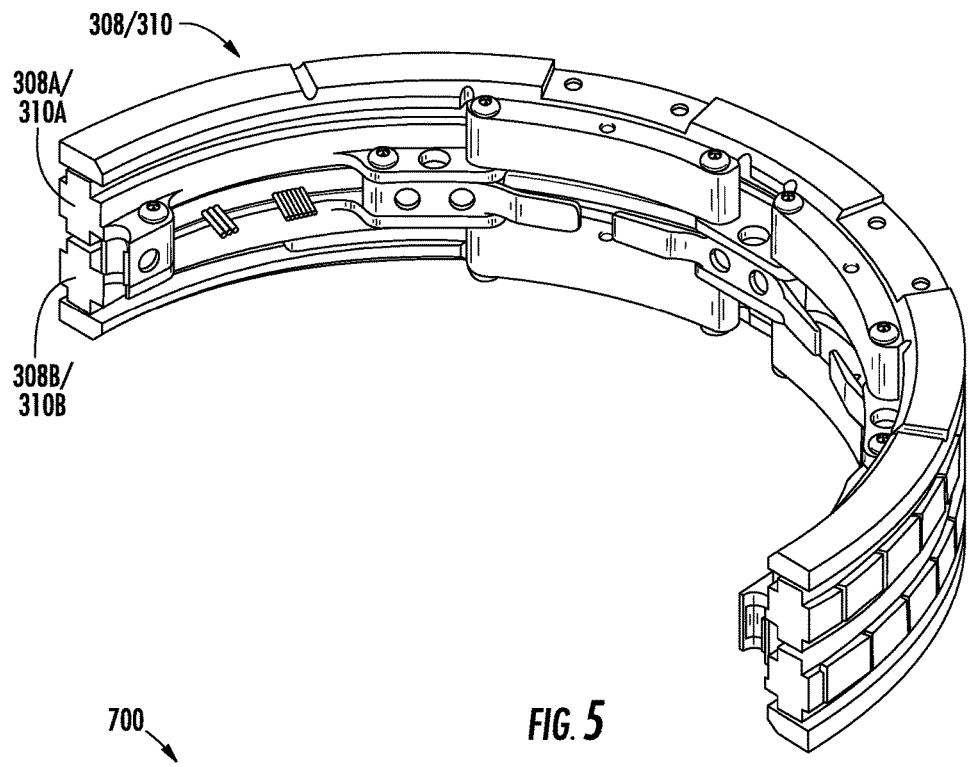
FIG. 5 is a perspective view illustrating an additional HAVC device component according to aspects of the subject matter described herein.

FIG. 5 is a perspective view of one set of heat sunk inside out brushless motor assemblies (e.g., either the upper or lower motor assemblies shown and described in FIG. 2) designated 308/310. Motor assemblies 308/310 comprise first and second vertically stacked motor windings (e.g., 308A stacked over 308B and 310A stacked over 310B) for rotating imbalanced rotors 304/306. First and second motor winding assemblies 308/310 comprise steel and copper windings comprising two inside out stators. The stators are bonded to aluminum rings using a thermally conductive potting compound for optimal heat sinking.

FIGS. 6 and 7 illustrate HAVC systems 700 having an HAVC device 100 mounted to a rotor hub 702. Rotor hub 702 has one or more openings 704 configured to receive and fixedly engage one or more respective rotary blades of a vehicular system, such as of a helicopter or hovercraft.

As FIG. 7 illustrates, HAVC system 700 having an HAVC device 100 with an integrated de-icing distributor 208 within electrical unit 200. De-icing distributor 208 is centrally disposed directly into the HAVC device 100. Slip ring 500 and de-icing distributor 208 encompass a portion of an inner diameter of HAVC device 100. The cover plate 202 of HAVC device 100 is removable for easy access to electrical components. When cover plate 202 is removed, electrical interconnects between the slip ring 500 and de-icing distributor 208, and the de-icing distributor 208 and the HAVC mechanical unit 300, and de-icing distributor 208 and de-ice bundles, which go out to each blade, are visible.

Drag within an aircraft is reduced via HAVC device 100. For example, refining the HAVC device 100 to have the electronics to fit in an electrical unit 200 above the motor windings assemblies and other mechanical components eliminates the need for a separate housing. Reduction of the space and volume required for the electronics includes reducing the power draw, moving three-phase rectification into the fixed frame of the aircraft, and increasing the density of the electronics design.

Figure 8:
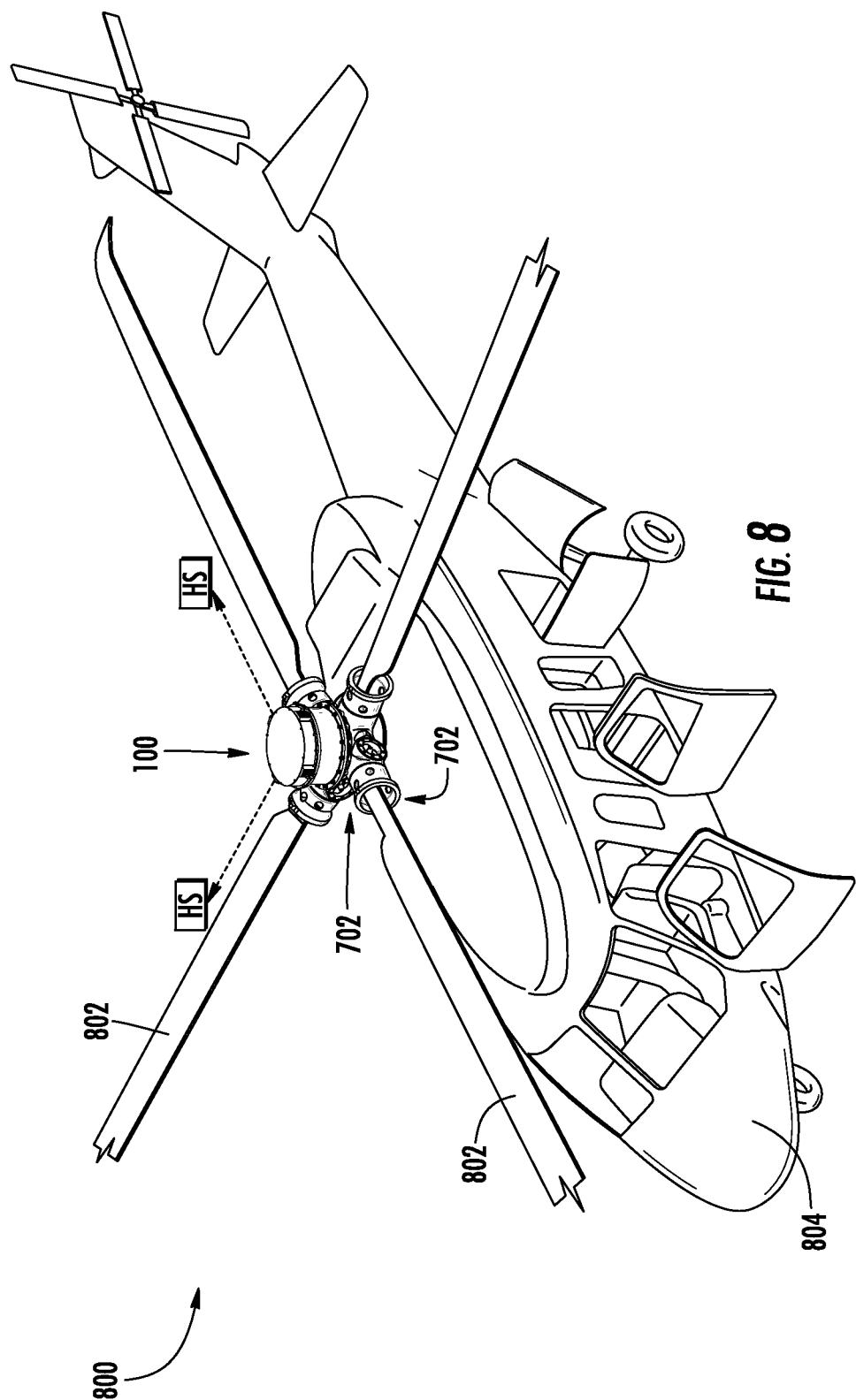
FIG. 8 is a schematic diagram illustrating a rotary winged aircraft incorporating HAVC devices and systems according to one aspect of the subject matter described herein.

FIG. 8 illustrates a rotary winged aircraft 800 including HAVC device 100 and HAVC system 700. Helicopter 800 comprises one or more rotary blades 802 configured to be received in openings 704 of rotor hub 702. Helicopter 800 further comprises a non-rotating or fixed body 804 frame. HAVC system 700 comprises HAVC device 100 mounted to rotor hub 702. In some aspects, HAVC device 100 has a dual frequency device configured to actively control (N−1)P and (N+1)P in-plane vibratory loads caused by rotation of rotor hub 702. HAVC devices, systems, and related methods described herein can be configured for use in single rotor and/or in tandem rotor aircraft.

HAVC device 100 rotates with the rotor hub 702 at once per revolution (1 per-rev or 1P) in a counter-clockwise direction as viewed from above rotor 702. Cancellation of the (N−1)P and (N+1)P in-plane vibrations as measured in the rotating reference frame is equivalent to canceling the NP in-plane vibrations as measured in the non-rotating reference (e.g., the helicopter airframe 804).

HAVC system 700 has one or more heating sources HS provided at one or more rotary blades 802. De-icing distributor 208 (FIG. 7) disposed within a portion of HAVC device 100 communicates instructions and/or electrical power to the one or more heating sources HS for preventing ice from forming on and/or for removing ice from the rotary blades 802.

In some aspects, hub-mounted active vibration control (HAVC) methods and/or methods of controlling in-plane vibratory loads occurring at a moving platform are provided. The method includes providing a moving platform, such as a rotor hub. The method includes mounting an HAVC device 100 to a portion of the moving platform. The device includes improved wear resistance, thermal properties, and compact dimensions as described hereinabove. The device has at least one pair of co-rotating imbalance masses for cancelling unwanted vibration. The device also has at least pairs of imbalance masses, each pair rotating at different frequencies and in different, opposing directions for cancelling unwanted vibration. The device has a tolerance ring (e.g., 600, FIG. 4A) attached to the mechanical unit. The tolerance ring accommodates expansion and contraction of dissimilar metals contained within the mechanical unit (such as the aluminum housing and stainless steel bearing assemblies). The method include rotating at least one pair of imbalance masses at a same frequency and/or two pairs of imbalance masses at different (e.g., dual) frequencies such that the combined forces of the imbalance masses substantially cancel unwanted vibration of the moving platform.

Other embodiments of the current invention will be apparent to those skilled in the art from a consideration of this specification or practice of the invention disclosed herein. Thus, the foregoing specification is considered merely exemplary of the current invention with the true scope thereof being defined by the following claims.

What is claimed is:

1. A hub-mounted active vibration control (HAVC) device (100), comprising:
   a housing configured to attach to a rotary hub and rotate therewith, wherein the housing includes a tolerance ring configured to accommodate dissimilar coefficients of thermal expansion between components of dissimilar metals, the tolerance ring further comprising:
   a lower attachment point; and
   a track, the track extending directly against and/or along an inner diameter of a housing;
   a plurality of coaxial ring motors configured to rotate a plurality of imbalance masses; and
   an electrical module for independently controlling a rotational position, phase, and/or speed of the plurality of imbalance masses such that the combined forces of the imbalance masses substantially cancel unwanted vibration.

2. The HAVC device of claim 1, wherein the housing is aluminum.

3. The HAVC device of claim 2, wherein a stainless steel bearing component is provided in the aluminum housing.

4. The HAVC device of claim 3, wherein the tolerance ring is provided between the housing and the stainless steel bearing component.

5. The HAVC device of claim 1, further comprising a de-icing distributor integrated within the housing.

6. The HAVC device of claim 1, wherein the plurality of coaxial ring motors has four coaxial ring motors.

7. The HAVC device of claim 6, wherein the four coaxial ring motors are configured to rotate four imbalance masses.

8. The HAVC device of claim 7, wherein two of the imbalance masses are configured to rotate at a first frequency and two other of the imbalance masses are configured rotate at a second frequency for cancelling unwanted vibration.

9. The HAVC device of claim 1, wherein the tolerance ring is press fit directly against the inner diameter of the housing.

10. The HAVC device of claim 9, wherein the tolerance ring extends about an entire inner circumference of the housing.

11. The HAVC device of claim 1, further comprising a removable lid.

12. The HAVC device of claim 11, wherein the electrical module further comprises a slip ring that is accessible through the removable lid while the housing remains attached to the rotary hub.

13. The HAVC device of claim 1, further comprising a plurality of imbalanced rotors integrated with a portion of the plurality of coaxial ring motors.

14. The HAVC device of claim 13, wherein each imbalanced rotor further comprises a dual stage bearing assembly with a single outer race.

15. A hub-mounted active vibration control (HAVC) device, comprising:
 a housing configured to attach to a rotary hub and rotate therewith, wherein the housing includes a tolerance ring configured to accommodate dissimilar coefficients of thermal expansion between components of dissimilar metals and a de-icing distributor integrated within the housing;
 a plurality of coaxial ring motors configured to rotate a plurality of imbalance masses; and
 an electrical module for independently controlling a rotational position, phase, and/or speed of the plurality of imbalance masses such that the combined forces of the imbalance masses substantially cancel unwanted vibration.

16. The HAVC device of claim 15, wherein the housing is aluminum.

17. The HAVC device of claim 16, wherein a stainless steel bearing component is provided in the aluminum housing.

18. The HAVC device of claim 17, wherein the tolerance ring is provided between the housing and the stainless steel bearing component.

19. The HAVC device of claim 15, wherein the plurality of coaxial ring motors has four coaxial ring motors.

20. The HAVC device of claim 19, wherein the four coaxial ring motors are configured to rotate four imbalance masses.

21. The HAVC device of claim 20, wherein two of the imbalance masses are configured to rotate at a first frequency and two other of the imbalance masses are configured rotate at a second frequency for cancelling unwanted vibration.

22. The HAVC device of claim 15, wherein the tolerance ring is press fit directly against an inner diameter of the housing.

23. The HAVC device of claim 22, wherein the tolerance ring extends about an entire inner circumference of the housing.

24. The HAVC device of claim 15, further comprising a removable lid.

25. The HAVC device of claim 24, wherein the electrical module further comprises a slip ring that is accessible through the removable lid while the housing remains attached to the rotary hub.

26. The HAVC device of claim 15, further comprising a plurality of imbalanced rotors integrated with a portion of the plurality of coaxial ring motors.

27. The HAVC device of claim 26, wherein each imbalanced rotor further comprises a dual stage bearing assembly with a single outer race.

* * * * *